(12) United States Patent
Ashley et al.

(10) Patent No.: US 9,621,592 B2
(45) Date of Patent: Apr. 11, 2017

(54) SYSTEM AND METHOD FOR SOFTWARE DEFINED DEPLOYMENT OF SECURITY APPLIANCES USING POLICY TEMPLATES

(71) Applicant: International Business Machines Corporation, Armonk, NY (US)

(72) Inventors: Paul Anthony Ashley, Toowong (AU); Stefan Berger, Ossining, NY (US); Tian Cheng Liu, Beijing (CN); He Yuan Huang, Beijing (CN); Sreekanth Ramakrishna Iyer, Karnataka (IN); Ashish Kundu, Elmsford, NY (US); Nataraj Nagaratnam, Cary, NC (US); Dimitrios Pendarakis, Westport, CT (US); Ronald Becker Williams, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/750,247

(22) Filed: Jun. 25, 2015

(65) Prior Publication Data
US 2016/0234224 A1 Aug. 11, 2016

Related U.S. Application Data

(63) Continuation of application No. 14/618,943, filed on Feb. 10, 2015.

(51) Int. Cl.
*H04L 29/06* (2006.01)
(52) U.S. Cl.
CPC ............ *H04L 63/20* (2013.01); *H04L 63/105* (2013.01)

(58) Field of Classification Search
USPC .......................................................... 726/1
See application file for complete search history.

(56) References Cited

U.S. PATENT DOCUMENTS

| 6,738,908 B1 | 5/2004 | Bonn et al. |
| 6,839,338 B1 * | 1/2005 | Amara ................ H04L 63/0227 370/338 |

(Continued)

OTHER PUBLICATIONS

White et al., "Building a Smarter Data Center with IBM Flex System and Juniper Networks QFabric," IBM International Technical Support Organization Mar. 2013.

(Continued)

*Primary Examiner* — Kambiz Zand
*Assistant Examiner* — Aubrey Wyszynski
(74) *Attorney, Agent, or Firm* — Jeff LaBaw, Esq.; McGinn IP Law Group, PLLC

(57) ABSTRACT

A method includes retrieving, from a memory accessible by a computer, a document comprising a workload definition document that defines an intended virtual configuration to include at least one virtual machine and at least one network appliance to be associated with at least one of the virtual machines in the intended virtual configuration, each network appliance respectively serving a role in the intended virtual configuration of transforming, inspecting, filtering, or otherwise manipulating all the network traffic, before it reaches an intended virtual machine, for purpose other than a data packet forwarding in a virtual configuration. The workload definition document is parsed to extract attributes of each of the network appliances, including one or more security policy to be applied to each network appliance. Configuration data is extracted from the parsed workload definition document that is related to any security policy of any of the network appliances to be deployed. A security template library is accessed to select a security template for each (Continued)

network appliance that will implement the one or more security policy for that network appliance to be deployed.

14 Claims, 9 Drawing Sheets

(56) References Cited

U.S. PATENT DOCUMENTS

| | | | |
|---|---|---|---|
| 7,516,476 | B1 | 4/2009 | Kraemer et al. |
| 7,720,097 | B2 | 5/2010 | Ohhira |
| 8,141,144 | B2 | 3/2012 | Good |
| 8,726,351 | B2 | 5/2014 | Metzer et al. |
| 2003/0037040 | A1* | 2/2003 | Beadles .................. H04L 41/22 |
| 2009/0241183 | A1* | 9/2009 | Boss ..................... G06F 17/218 726/17 |
| 2013/0291052 | A1* | 10/2013 | Hadar ................. G06F 21/6218 726/1 |
| 2013/0333045 | A1* | 12/2013 | Shigemoto ........... G06F 21/577 726/25 |
| 2014/0164607 | A1* | 6/2014 | Bai ....................... H04L 43/045 709/224 |
| 2015/0067404 | A1* | 3/2015 | Eilam ................. G06F 11/3006 714/38.1 |

OTHER PUBLICATIONS

Kim et al., "CometCloud: An autonomic cloud engine." Cloud Computing: Principles and Paradigms (2011): 275-297.

Yee et al., "Security personalization for internet and web services." NRC Publications Archive (2007).

Satoh et al. "Methodology and tools for end-to-end soa security configurations." Services—Part I, 2008. IEEE Congress on. IEEE, 2008.

Nakamura et al., "SEEdit: SELinux Security Policy Configuration System with Higher Level Language." HitachiSoft 2009.

United States Office Action dated Apr. 6, 2016 in U.S. Appl. No. 14/618,943.

United States Office Action dated Nov. 2, 2016 in U.S. Appl. No. 14/618,943.

\* cited by examiner

- Goals /402
  - Provide a single XML for the filtering rules on the XGS
  - All filtering functionality to be supported by this XML
  - 'Authored' using existing XGS GUI

[Network Access Policy table /404 showing two rules with columns: Order, Enable, Source, Destination, Application, Action, Alert, Inspection, Schedule, Comment]

- Simple (static) XML example: /406

```
<xgstemplate>
  <naprules>
    <naprule name="1st rule" enabled="true" action="accept" comment=""> /408
      <sources>
        <source ip="10.0.0.0/24" comment=""/>
      </sources>
      <destinations>
        <destination ip="8.8.8.8"/>
        <destination ip="8.8.4.4"/>
      </destinations>
      <alerts>
        <rsyslog targethost="9.10.10.10" port="514" qradarformat="true"/>
      </alerts>
    </naprule>
    <naprule enabled="true" action="drop" comment="drop all other traffic"/>
  </naprules>
</xgstemplate>
```

Simple (dynamic) XML template example
- $IP represents a variable that will be replaced upon 'instantiation' of the XML
- Setup dependent value assignment
- Variables can be placed in any attributes' values

```
<xgstemplate>
<naprules>
<naprule enabled="true" action="accept" comment="" >
  <sources>
    <source ip="$ip" comment=""/>          ──── 502
  </sources>
  <destinations>
    <destination ip="8.8.8.8" />
    <destination ip="8.8.4.4" />
  </destinations>
  <alerts>
    <rsyslog targethost="9.10.10.10" port="514" qradarformat="true" />
  </alerts>
</naprule>
<naprule enabled="true" action="drop" comment="drop all other traffic" />
</naprules>
</xgstemplate>
```

FIG. 5

Example Heat JSON Markup

600

```
[...]
"Resource" : {
  "TestVM" : {
    "Type": "AWS::EC2::Instance",
    "Properties" : {
      "ImageId" : { ... },
      [...]
    }
  }
  "XGS" : {
    "Type" : "OpenStack::MiddleBox::IBM::XGS",
    "Properties" : {
      "ImageId" : { ... },
      "Targets" : [{
        "InstanceId" : { "Ref" : "TestVM" },
        "NetworkInterfaces" : [ { "Ref" : "NI1"}, {...} ],
        "XGSTemplate" : { "http_protect" }
        "Variables" : {
          "dnsserver" : "8.8.8.8"
        }
      }]
    }
  }
}
```

VM Declaration — 602

Extensions for XGS Security MiddleBox — 604

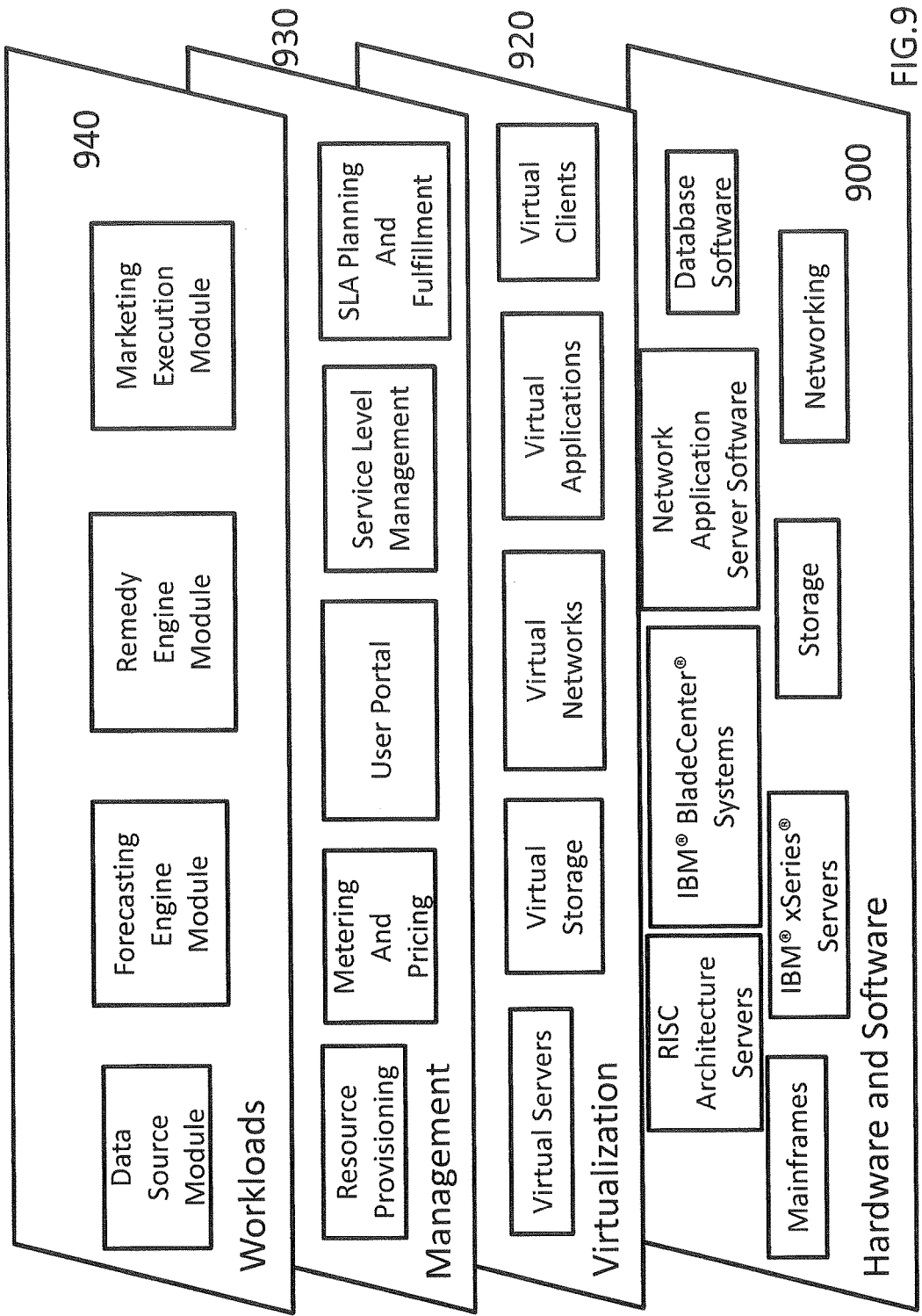

SYSTEM AND METHOD FOR SOFTWARE DEFINED DEPLOYMENT OF SECURITY APPLIANCES USING POLICY TEMPLATES

This Application is a Continuation Application of U.S. patent application Ser. No. 14/618,943, filed on Feb. 10, 2015.

BACKGROUND

The present invention relates to improving security in computer systems. More specifically, it provides a virtual security appliance deployment tool that makes use of a library of security policy templates enabling automatic creation, configuration, and deployment of security appliances for workloads in cloud and virtualized environments without requiring that a user configure the security policy and other parameters of the instantiated security appliances.

In virtualized and cloud computing environments, complex workloads can be assembled and deployed dynamically. In the context of the present invention, the term "workload" refers to the instantiation of a virtual computing configuration including at least one virtual machine that is running an application. Conventionally, the composition, topology, and configuration parameters of complex workloads can be specified through workload definition documents (WDDs) and modified through APIs (Application Program Interfaces) offered by a cloud management stack. In the context of the present invention and as well known in the art, an API is a set of routines, protocols, and tools for building software applications which specify how software components should interact. The API set is often used when programming graphical user interface (GUI) components.

The present inventors have recognized that the automated deployment of computing workloads has not been accompanied by a corresponding automated deployment of network security controls (appliances) that provide security functionality for computing workloads. Furthermore, the network security controls are not automatically configured with appropriate security policies providing optimal protection for the workload. Currently, cloud computing environments provide ways to deploy basic network security controls like traffic firewalls that filter traffic at layers 2, 3, and 4, for example, in the form of security groups as implemented, for example, in the OpenStack cloud computing software platform exemplarily used herein to describe the concepts of the present invention. Although cloud computing environments already provide ways for deploying (virtual) security appliances, for example appliances for intrusion detection/prevention, data encryption, monitoring, and security intelligence, these deployments require that a user make appropriate settings to these highly complex (virtual) security appliances.

The present inventors have also recognized that, once these appliances are deployed, currently it is not possible to automatically drive the configuration of their security policies based on the types of workloads that have been deployed. Instead, cloud users typically get access to the security appliance management console, set of APIs, etc., and have to use these to themselves provision the appropriate security policies for the workload they have deployed. Configuring appropriate policies for these complex security appliances, however, typically requires expert users with the appropriate skill set to apply knowledge of the workloads' security requirements to the security policies for those (virtual) security appliances.

SUMMARY

According to an exemplary embodiment of the present invention, to address these problems, the present inventors have recognized that such problems can be addressed by providing re-useable security policy templates that can be automatically linked with the type of workload being deployed in a cloud, customized for deployment in specific cloud environments, and can even be dynamically adapted as security policies change, for example, due to detected anomalies.

The present invention thereby provides automated deployment of virtual appliances as part of a complex workload, including the configuration of the (virtual) security appliance for providing optimal protection of specific workload(s). An implementation of the present invention can also be used to automate the setup of appropriate policies as new workloads are added/removed or other changes made to the configuration. The present invention goes beyond the state of the art by matching expert-provided security policy templates to workloads' security requirements and by configuring the security policies enforced by (virtual) security appliances.

The present invention leverages conventional software-defined infrastructure, such as SDN (Software-Defined Networking), to dynamically deploy new security controls, redirect traffic, etc., to achieve middlebox configuration in virtual networking environments. A middlebox can be a network appliance that is dynamically inserted into the network packet flow in front of a target device and receives all packets before they reach said target device. Middlebox insertion is enable by SDN, which can be regarded as an approach to computer networking that allows network administrators to manage network services through abstraction of lower-level network switching functionality and provides network administrators control via policy-enabled workflow automation.

In the context of the present invention, a middlebox, also referred to herein as a network appliance or a network control, is a computer networking device that transforms, inspects, filters, or otherwise manipulates traffic for purposes other than packet forwarding. Common examples of middleboxes include, for example, firewalls, which filter unwanted or malicious traffic, and network address translators, which modify packets' source and destination addresses.

Dedicated middlebox hardware is widely deployed in enterprise networks to improve network security and performance, and the IBM® XGS® appliance can be used as one such middlebox to provide IDS/IPS (intrusion detection system/intrusion protection system) functions. The next generation XGS will incorporate a number of other middlebox functions other than IDS/IPS functions, so that the XGS is ideal as an exemplary platform to explain concepts of the present invention, given that the next generation will have multiple middlebox functions available and can accordingly selectively provide any or all of different middlebox functions.

The widespread deployment of middleboxes and other network appliances has resulted in some challenges and criticism due to such factors as poor interaction with higher layer protocols and difficulty in configuring middlebox functions for optimal results if one does not have expertise. The present invention can alleviate some of these deployment problems as applied to virtual configurations by providing a tool that can automatically configure middlebox functions without requiring assistance of an expert.

BRIEF DESCRIPTION OF THE DRAWINGS

FIG. 4 exemplarily shows a simple static XGS template 400 in XML;

FIG. 5 exemplarily shows a simple dynamic XGS template 500 in XML;

FIG. 6 exemplarily shows a Heat JSON markup 600;

FIG. 9 depicts abstraction model layers 900-940 according to an embodiment of the present invention.

DETAILED DESCRIPTION

Figure 1:
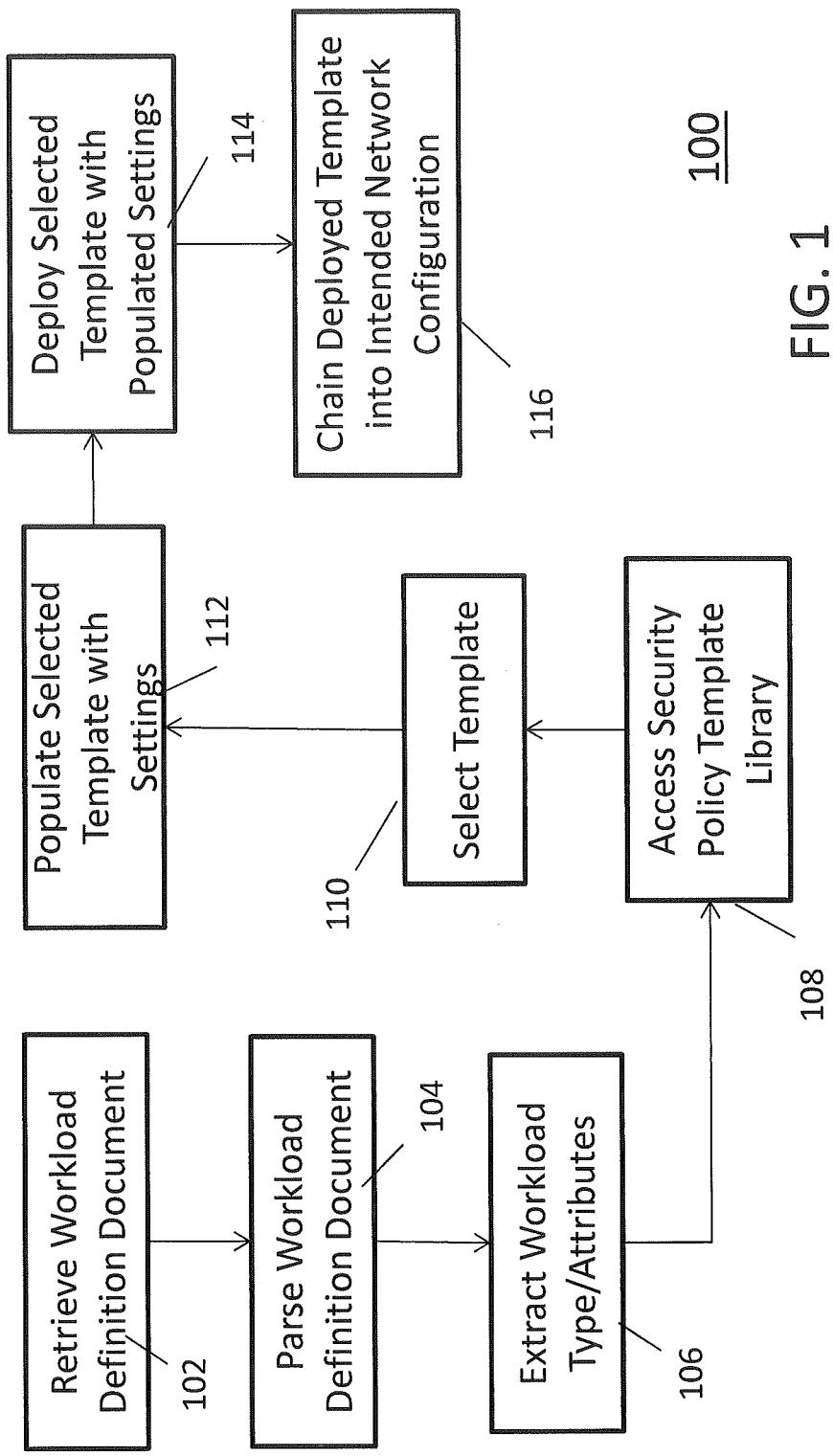
FIG. 1 describes an exemplary embodiment of the present invention in a generic, high-level flowchart format 100.

With reference now to FIG. 1, the present invention provides a system and method for creating security policy templates or re-usable policy building blocks that can be deployed with matching workloads in cloud and virtualized environments. These building blocks can be composed into full policies that are used to configure virtual or physical security appliances. The method of the present invention automatically determines and applies security appliance policies based on the type of workloads that are dynamically deployed in a cloud computing environment. The system links the workload definition, which may consist of multiple tiers and multiple VMs (virtual machines) with the cloud management system and the security appliance management, allowing cloud users to have a unified management system for deploying workloads/VMs and configuring security policies.

In one exemplary instantiation used to explain the concepts of the present invention, the cloud management system relied upon is based on OpenStack, a free and open-source cloud computing software platform which users primarily deploy as an Infrastructure as a Service (IaaS) solution. A second key component used in explaining the present invention is a virtual XGS security appliance, corresponding to IBM's XGS 5100®, known in the art as a hardware IPS/IDS (Intrusion Prevention System/Intrusion Detection System) component, available as a physical appliance since 2013, and used for in-line, real-time intrusion protection to defend critical data and applications. Release of the virtual machine version of the XGS is imminent.

The XGS appliance provides intrusion prevention functions for Ethernet networks, including botnet (e.g., a collection of Internet-connected programs communicating with other similar programs in order to perform tasks) command and control protection, malware protection, Secure Sockets Layer (SSL) man-in-the-middle inspection of encrypted traffic, firewall protection for web applications, application and application action control, protocol analysis-based intrusion prevention, URL filtering, Injection Logic Protection, Shell Code heuristics, and virtual patch. The XGS thus has a number of characteristics, including its capability to protect against Web vulnerabilities such as SQL injection and cross-site scripting attacks, its fine grained network access control policy ("who, what, when"), its ability to inspect encrypted (SSL) traffic, and URL categorization and filtering (Web application filtering).

However, it should be clear that the present invention, once understood, could be implemented with either virtual or physical (hardware) components, and it should also be clear that specific components other than OpenStack or XGS could also be used.

A key aspect of typical cloud workloads is that they are complex, dynamic (e.g., auto-scale, migrate, etc.), and have some parameters determined at deployment time. Security policy templates support multiple artifacts to automate the deployment and facilitate the configuration of security policies for security appliances in cloud environments, including the following attributes and components:

1. Parameters: these may express properties that are cloud deployment specific and thus allow the separation of abstract security policies for a given type of workload from specifics about the instantiation of the workload in a cloud. A typical example of a parameter is an IP address; typically this is known only at cloud deployment time, when the parameter can be assigned.

2. Arrays and iterators: these provide a way to define and assign multiple parameters to a specific component inside a security policy; e.g. assign multiple IP addresses to a variable that serves as a placeholder and can take on multiple concrete values.

3. Sections: these facilitate the ordering of security rules/policies as they are applied, for example on network traffic in form of network traffic filtering rules. For example, the ordering of network traffic rules within a particular section does not matter, while the ordering of sections relative to each other does matter.

4. "Owners" of rules: these allow the association of owners with particular filtering rules and facility easier life-cycle management of individual rules, including their deletion and replacement.

As shown in the generic flowchart 100 of FIG. 1, the automated middlebox deployment mechanism of the present invention begins in step 102 by receiving a Workload Definition Document (WDD) that defines an intended workload deployment. In step 104, the WDD is parsed, so that, in step 106, the workload type and attributes and other configuration data can be extracted. In the exemplary embodiment of the present invention, this parsing and extraction automatically invokes, in step 108, access to a security policy deployment tool that can retrieve security policy templates from a template library. This library could be directly associated with the computer executing the WDD parsing, or could be a database remotely located and accessible to the computer via a network. By using a word search mechanism, in step 110, the library can be searched/filtered to select the template from the library that appropriately matches the WDD extractions for attributes of the intended security policy configuration. The searching/filtering process of the library could be executed by the machine that executed the WDD parsing or could be executed by different remote processing, with the results communicated back to the computer executing the tooling mechanism of the present invention. In step 112, the selected template is then populated with parameter values that are based on data found in the WDD and parameters such as a workload's IP addresses set up by the virtual network configuration manager. In step 114, the populated selected template is converted into a security policy that the deployed (virtual)

security appliance understands and the (virtual) security appliance is finally programmed with the security policy. In step 116, the deployed (virtual) security appliance is chained into the network configuration defined by the WDD, thereby enabling the network middlebox configuration and, with that, enabling the filtering of the traffic for a workload that is to be protected from possibly malicious data.

Figure 2:
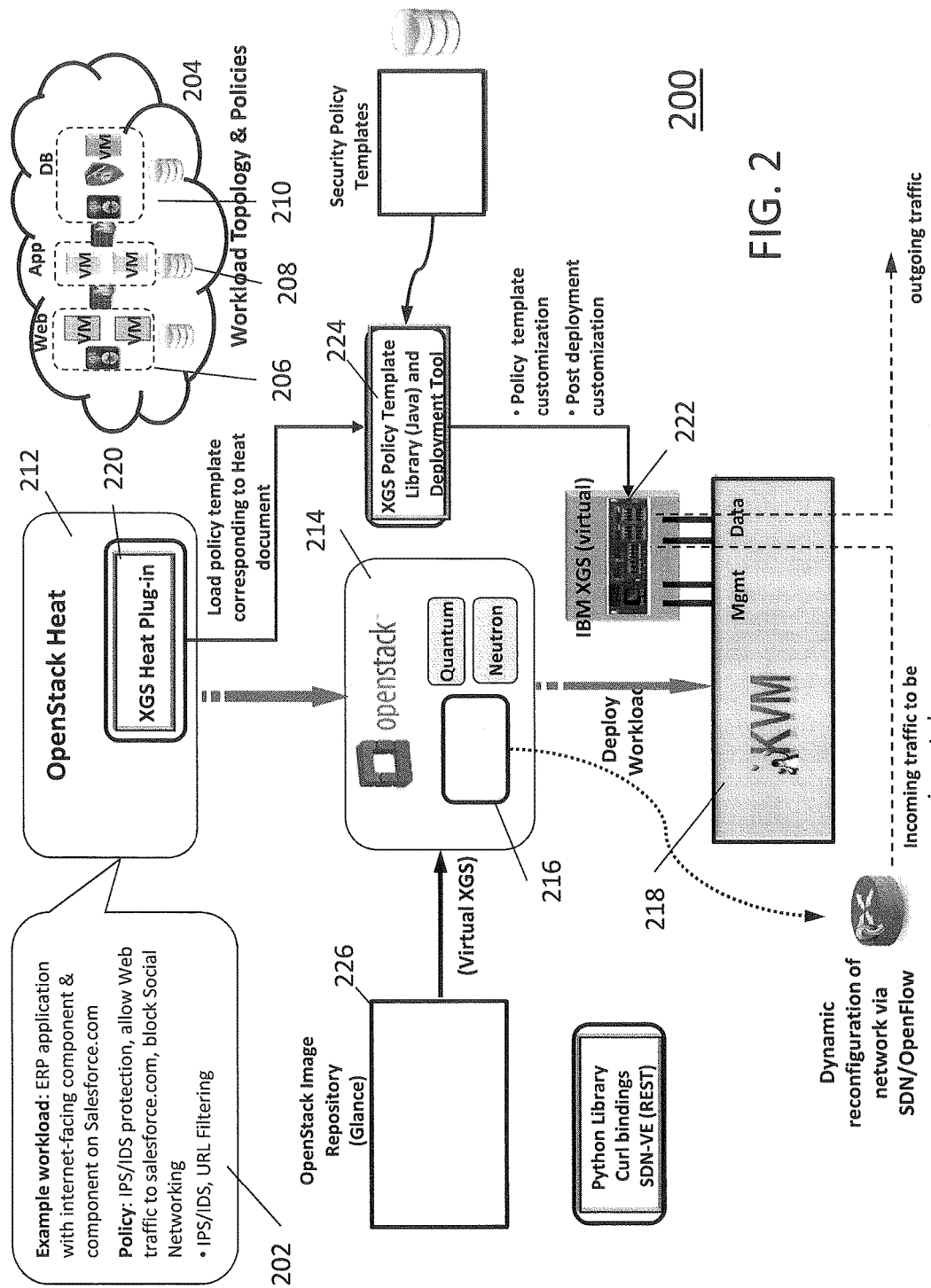
FIG. 2 describes a specific exemplary embodiment 200 based on Openstack's orchestration engine Heat and XGS components for a simple exemplary workload configuration with five VMs and five middleboxes.

FIG. 2 presents a pictorial/diagrammatic exemplary overview 200 of the present invention, as implemented exemplarily using OpenStack on a Linux®, operating system, to implement virtual XGS functions in an intended virtual configuration. However, the present invention is not contingent on OpenStack, Linux, or XGS, since virtual orchestration platforms other than OpenStack, operating systems other than Linux, and network appliances other than XGS could also provide platforms upon which to implement the present invention. Examples for other cloud management system are CloudStack or proprietary systems from Amazon®, or Microsoft®, that could similarly implement the present invention's functionality. Further, there are many vendors that offer virtual security appliance, among those VMWare®, Cisco®, Juniper®, Hewlett Packard®, and Fortinet®, that could take the role of the exemplary XGS appliance of the present invention.

For any conventional virtual management/orchestration platform, the starting point is a workload definition document (WDD), which would describe the exemplary intended workload 202. In the case of OpenStack, the workload definition document is a Heat JSON document that specifies the type of workload and high-level security requirements. In the present invention, the user would prepare a WDD in the conventional manner for the OpenStack management system.

In the exemplary scenario of FIG. 2, the intended workload topology configuration 204 and security policies are shown in the upper right corner of FIG. 2, as including a first tier 206 with two VMs and associated IDS middlebox, a second tier 208, and a third tier 210 with one VM and associated IDS and database protecting middleboxes.

For clarity of the nomenclature of the intended workload 202 in FIG. 2, it is noted that the term ERP stands for Enterprise Resource Planning, a business management software, and usually a suite of integrated applications, that a company can use to collect, store, manage and interpret data from many business activities, including product planning, cost, manufacturing and/or service delivery, and marketing and/or sales. ERP business process management software allows an organization to use a system of integrated applications to manage the business and automate many back office functions related to technology, services, and human resources.

OpenStack Heat 212 is a project of the OpenStack Orchestration program and aims to create a human and machine-accessible service for managing the entire lifecycle of infrastructure, virtual machines, and applications within OpenStack clouds. Heat implements an orchestration engine that can launch multiple composite cloud applications based on templates that are written in the form of text files and can be treated like code. A Heat template describes the infrastructure for a cloud application in a text file that is readable and writable by humans. Infrastructure resources that can be described include virtual machines, floating IP addresses, storage volumes, security groups for low-level filtering of network traffic that can reach VMs, network and subnet configurations, etc. Templates can also specify the relationships between resources, e.g. a specific storage volume is connected to a particular virtual machine. The detailed description of the intended cloud application configuration enables Heat to invoke the OpenStack APIs to create all of the intended infrastructure, including virtual machines, in the correct order and to completely launch an application 204.

Heat can also manage the whole lifecycle of an application, so, when a user needs to change part of said application infrastructure, the template can simply be modified and used for updating. Heat knows how to make the necessary changes and will also delete all of the resources when the application is completed.

OpenStack Neutron/Quantum 214 is a cloud networking controller and a networking-as-a-service project within the OpenStack cloud computing initiative. Neutron includes a set of application program interfaces (APIs), plug-ins and authentication/authorization control software that enable interoperability and orchestration of network devices and technologies within infrastructure-as-a-service (IaaS) environments.

The OpenDaylight software 216 is a combination of components including a fully pluggable controller, application programming interfaces, protocol plug-ins and applications. With this common platform both customers and vendors can innovate and collaborate in order to commercialize SDN- and NFV-based (network function virtualization) solutions. KVM (Kernel-based Virtual Machine) 218 is a virtualization infrastructure for the Linux kernel that turns it into a hypervisor. The KVM 218 thus serves as a hypervisor for the virtual workload configuration 204. In the exemplary implementation of the present invention, a workload definition document is parsed and executed by Heat. Heat plugins 220 are invoked after the contents and requirements are found during the parsing of the WDD. As part of the plugin invocations, the XGS plugin 220, developed as a component of the present invention, may also be invoked and trigger the deployment of a (virtual) security appliance as well as its configuration with a security policy, as per the present invention.

Thus, in FIG. 2, the XGS Heat Plug-in 220 is a component developed for the present invention and is responsible for parsing the part of the WDD that describes the parameters relevant for deploying the XGS as a middlebox and its related security requirements. It is also responsible for configuring the underlying components, such as instantiating an XGS virtual machine from a virtual machine image from OpenStack glance image repository 226, and configuring the XGS's filtering policy to implement the requirements. The parsing of the JSON document triggers the invocation of a security policy deployment tool 224 of the present invention, which in turn accesses a database of policy templates and builds or composes the workload specific security template based on the workload type, requirements found in the WDD, and other attributes. The Heat Plug-in 220 works with the cloud management infrastructure (e.g. OpenStack) to deploy the virtual security appliance 222 and populates parameters of the workload and the policy template, like, for example, IP addresses that OpenStack develops as it instantiates the components of the intended virtual configuration 204. In the exemplary instantiation used to explain the present invention, the security appliance is a virtual appliance of a next generation intrusion detection/intrusion prevention (IPS/IDS) device. In addition to IPS/IDS functionality, the next generation IBM XGS appliance additionally supports firewalling, URL filtering, SSL traffic inspection and web application filtering, so any of these additional capabilities can be selectively implemented with the XGS templates.

The following discussion assumes that the XGS appliance is a virtual component although a conventional XGS hardware appliance could also be incorporated into the intended workload configuration 204. The XGS policy template library 224 is a key component developed for the present invention. It provides security policy templates, which are selected following the parsed workload definition document, and used to create the security policy enforced by the virtualized XGS security appliance 222. The virtualized XGS will typically be instantiated from a copy of the virtual XGS image 226 from the OpenStack Image Repository.

From a slightly different, more generic perspective, the present invention can be described as providing a computer-based tool system that is based on providing a library of security templates for network appliance (e.g., XGS). These security templates have been previously prepared by an expert familiar with different security requirements of different types of possible workloads. The tool system of the present invention includes a network appliance plug-in (e.g., XGS Heat Plug-in) that interfaces with an API of a conventional virtual configuration orchestration/management tool (e.g., Heat). If invoked by the user, the network appliance plug-in automatically uses results of the parsed WDD to select the proper security policy templates, from the security template library, and then fills in proper variable values into the template, as available from the parsed WDD and other inputs, such as IP addresses from the orchestration/management tool (e.g., Heat). The present invention thereby provides a mechanism to permit a user to define a conventional workload definition document for a conventional virtual configuration orchestration/management tool, with the security settings for any network appliance in the intended workload being automatically set by the tool of the present invention, based on variables identified by the user in the conventional workload definition document.

Figure 3:
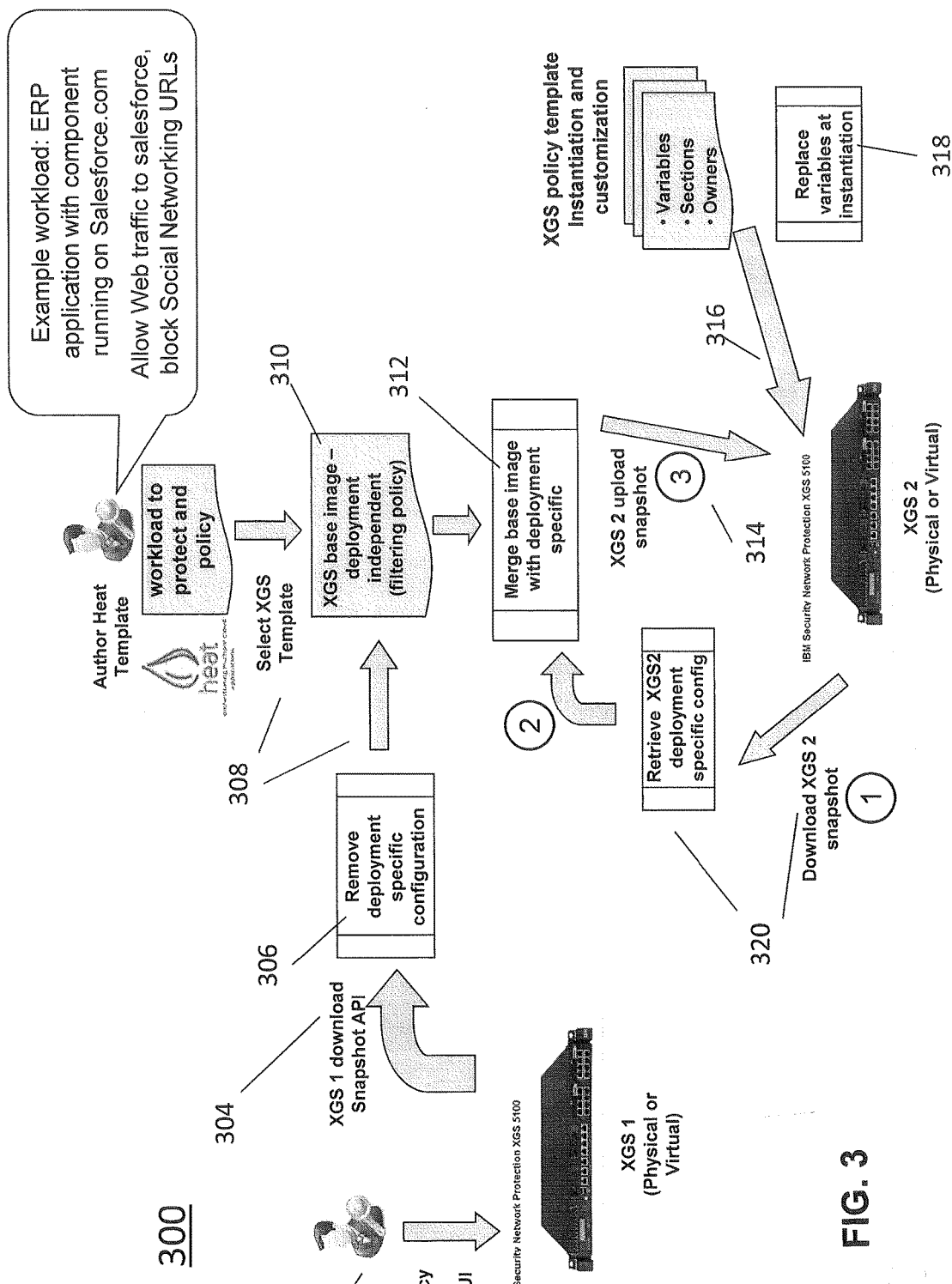
FIG. 3 shows a sequence of actions 300 for the exemplary scenario described in FIG. 2.

FIG. 3 shows the lifecycle 300 of creating and deploying security policy templates, using OpenStack Heat and XGS, as per the previous discussion. It shows the configuration of the XGS by an expert user interacting with the device's Web Services GUI, in step 302, configuring the device to, for example, create a security policy protecting a specific type of workload. In step 304, a snapshot of the XGS's current state is taken and stored into a file. The current state contains deployment specific configuration information, such as the IP address of the device in its local setting or configuration data such as the time zone the device is located in. It also contains non-deployment specific information, such as the current network filtering security policy. To be able to use the snapshot in the previously described middle box insertion scenarios in environments other than the one where the expert user is located in, it is necessary that all deployment specific configuration data is removed from the snapshot, as shown in step 306. What is left is an 'XGS base image' that can be transferred between XGS installations. This base image contains default configuration settings that represent a well-known start-out state for any subsequent configuration of the device.

Before the XGS 'base image' is uploaded 308 to a target XGS, the snapshot from the target XGS is retrieved and all non-deployment-specific data are removed and the remaining deployment-specific parameters 310 are merged 312 with the non-deployment-specific parameters of the 'XGS base image'. The resulting snapshot is uploaded 314 to the XGS. At this point the XGS can be considered to be in a well-known start-out state. Deployment-specific data are, for example, time zone configuration, user accounts of the XGS, etc. In another step 316 the XGS security policy template can be instantiated on the XGS. The security policy template may previously have been acquired by an expert user by retrieving the security policy configuration from the XGS device. The export user may have done this in another step than 302. The retrieval of the security policy template can be achieved by using a tool written for this purpose. To realize step 316, the XGS security policy deployment tool is invoked, which in turn searches the library of security templates for the name of the requested security template and retrieves the actual templates, which in the present invention are exemplarily XML type of documents. The security policy deployment tool parses the XML policy template documents and replaces variables 318 found in those documents with concrete values that were passed to the deployment tool as part of its invocation. It then instantiates the filtering rules and as part of that may create filtering rules that serve as headers for sections 316 of filtering rules. Filtering rules belonging to a particular section may then be inserted at the appropriate place under the filtering rule representing the start of a section. To be able to associate individual filtering rules with owners 316, such as virtual machines to which certain traffic filtering rules apply, an owner identifier is encoded in the comment of a particular filtering rule. Ownership association of rules allows for easier life-cycle management of filtering rules, such as their deletion or replacement.

Step 320 shows how an existing XGS configuration snapshot can be downloaded for modification or changes.

The screenshot in FIG. 4 shows a simple static XGS template 400 achieving the intended goals 402 as set by the user with the exemplary GUI settings 404. The values 406 can be seen in the exemplary GUI as well as in the XML representation of this simple policy. The IP addresses 408 may be specific to the environment where the policy is being applied.

FIG. 5 shows an exemplary simple dynamic XGS template 500 with one variable 502. The shown policy is a derivative of the policy shown in FIG. 4 where the IP address 10.0.0.0/24 has been replaced with the variable (placeholder) 'ip' that needs to be assigned a concrete value upon instantiation of the template. In the present invention either the WDD parsed by Heat and the Heat plugin, or Heat itself would have to provide a value for the variable 'ip' to the security policy deployment tool so that the template can be instantiated on the XGS. The dollar sign '$' before the variable name merely indicates that the following letters are to be understood as the name of a variable.

Once the security appliance is deployed, it is necessary to chain this appliance into the network traffic flow so that the traffic can be monitored by the security appliance. FIG. 2 shows a sample service chain 204 having various security appliances. After the security appliance, say an IPS, is deployed and configured as described above, it needs to be chained in the network as shown in the picture. To do this, the Cloud management infrastructure needs to configure the network. In the case of OpenStack, the Heat plugin interacts with Neutron, which further invokes the corresponding Neutron plugin, to do so. One previous invention "Method and apparatus for realizing service chaining" (CN9-2014-0029), incorporated herein by reference, describes a method and apparatus to implement such service chaining using Software Defined Networking technology. FIG. 6 shows a small portion 600 of a sample Heat template markup in JSON format, with VM declaration 602 and extensions 604 that define the security requirements for the XGS middlebox. The "type" statement 606 indicates that an XGS middlebox is to be incorporated. The "ImageId" statement

608 causes a certain XGS base image to be retrieved and instantiated on the XGS (see FIG. 3). "Targets" 610 identifies "TestVM" 612 as the VM whose workload is to be protected. "NetworkInterfaces" 614 provides the lists of interfaces of the "TestVM" whose packet stream is to be protected by the XGS. The example shows that the packet stream entering the VM's network interface 'NI1' is to be protected. "XGSTemplate" identifies "http_protect" as the name of the XGS security template to be applied, which will be retrieved from the security template library of the present invention. A list of values 618 is shown and an exemplary variable "dnsserver" is assigned the value "8.8.8.8" 620. It can be expected that the examplary http_protect template contains a variable "dnsserver".

It should be clear that parsing this Heat template document would provide the information necessary to provide an appropriate security template from the security template library of the present invention.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
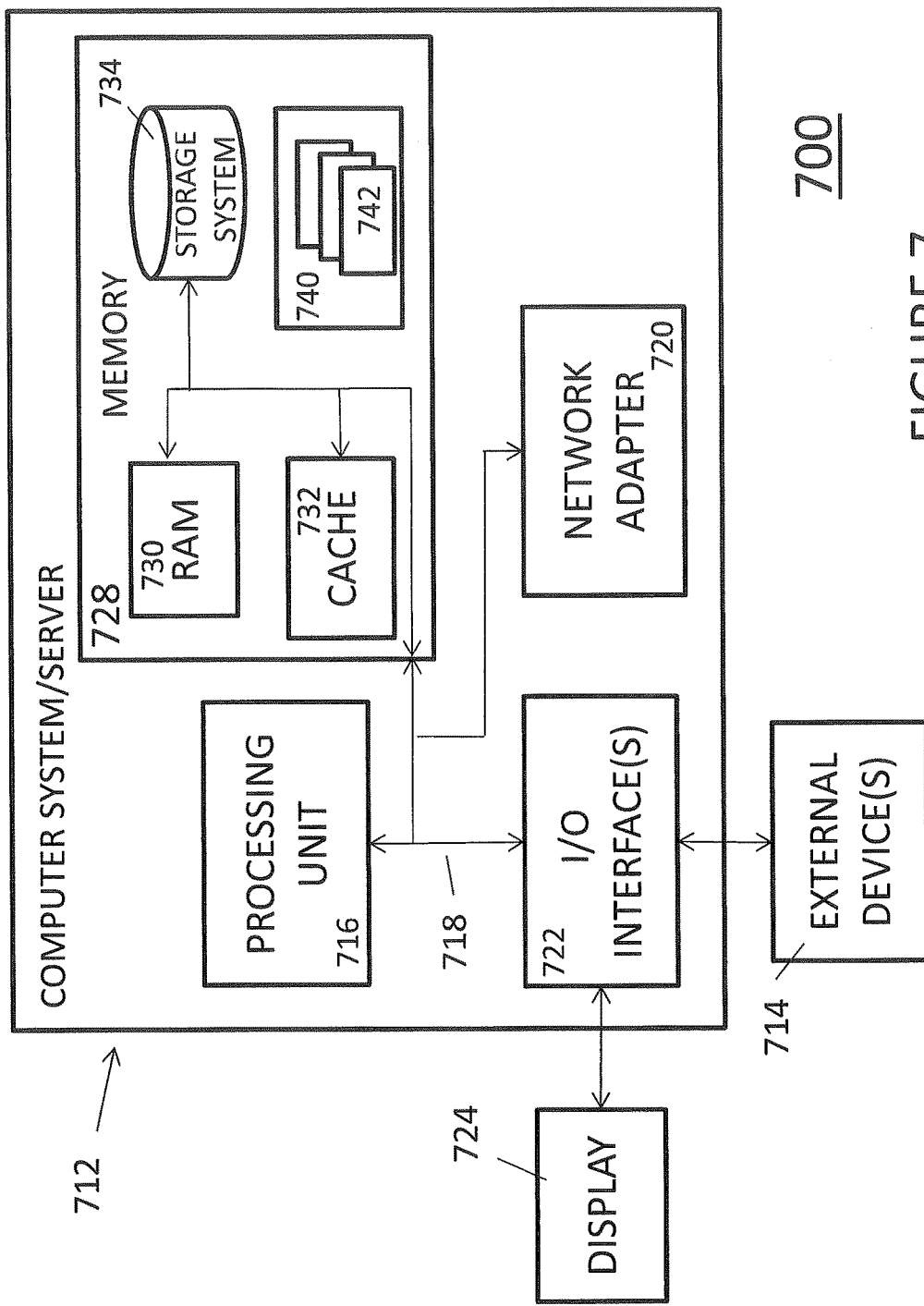
FIG. 7 depicts a cloud computing node 700 according to an embodiment of the present invention.

Referring now to FIG. 7, a schematic 700 of an example of a cloud computing node is shown. Cloud computing node 700 is only one example of a suitable cloud computing node and is not intended to suggest any limitation as to the scope of use or functionality of embodiments of the invention described herein. Regardless, cloud computing node 700 is capable of being implemented and/or performing any of the functionality set forth hereinabove.

In cloud computing node 700 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
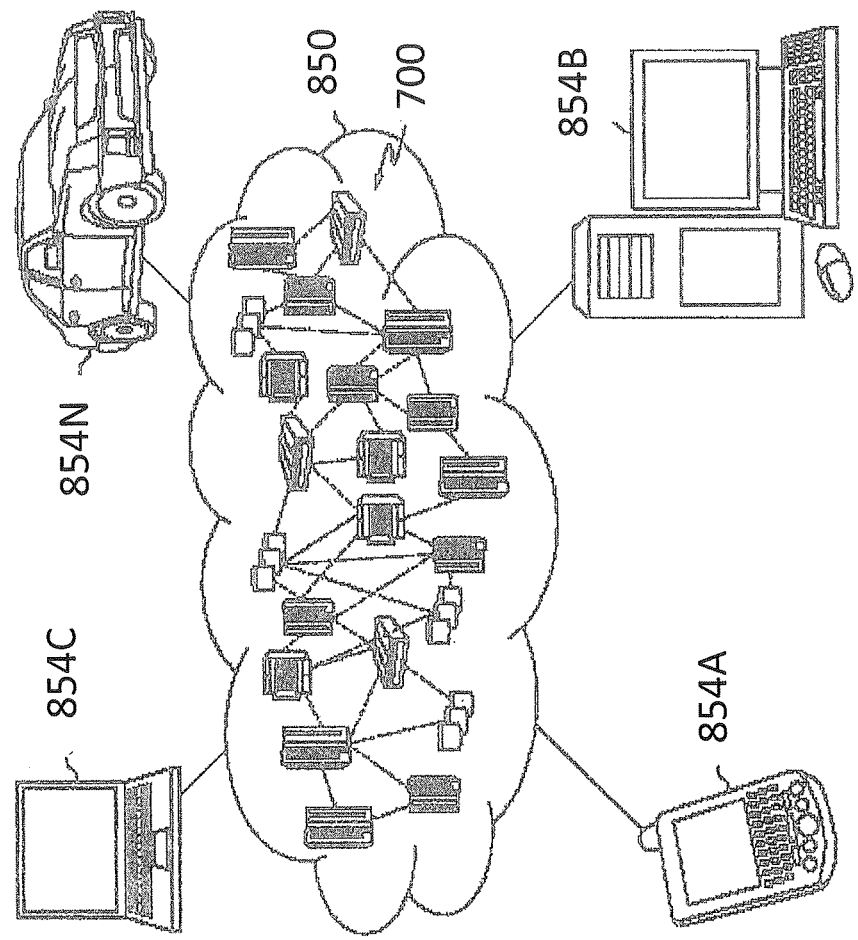
FIG. 8 depicts a cloud computing environment 850 according to an embodiment of the present invention.

Referring now to FIG. 8, illustrative cloud computing environment 850 is depicted. As shown, cloud computing environment 850 comprises one or more cloud computing nodes 700 with which local computing devices used by cloud consumers, such as, for example, personal digital assistant (PDA) or cellular telephone 854A, desktop computer 854B, laptop computer 854C, and/or automobile computer system 854N may communicate. Nodes 700 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 700 and cloud computing environment 850 can communicate with any type of computerized device over any type of network and/or network addressable connection (e.g., using a web browser).

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 900 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 900.

Virtualization layer 920 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 920.

In one example, management layer 930 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 940 provides examples of functionality for which the cloud computing environment may be utilized. Examples of workloads and functions which may be provided from this layer include any number of functions and applications, such as mapping and navigation; software development and lifecycle management; virtual classroom education delivery; data analytics processing; transaction processing; and, more particularly relative to the present invention, the APIs and run-time system components of the graph analytical tool described here.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   retrieving, from a memory accessible by a computer, a document comprising a workload definition document that defines an intended virtual configuration to include at least one virtual machine and at least one network appliance to be associated with at least one of the virtual machines in the intended virtual configuration, each network appliance respectively serving a role in the intended virtual configuration of transforming, inspecting, filtering, or otherwise manipulating all network traffic, before said network traffic reaches an intended virtual machine, for purpose other than a data packet forwarding in a virtual configuration;
   parsing, using a processor on the computer, the workload definition document to extract attributes of each of the network appliances, including one or more security policies to be applied to each network appliance;
   extracting configuration data from the parsed workload definition document that are related to any security policy of any of the network appliances to be deployed;
   accessing a security template library to select a security template for each network appliance that will implement the one or more security policies for that network appliance to be deployed;
   retrieving a base image for each network appliance to be deployed;
   merging deployment-specific data from a snapshot taken from each network appliance with the a base image; and
   configuring each network appliance with at least one selected security template.

2. The method of claim 1, further comprising inserting values for each variable in each deployed network appliance, based on at least one of:
   values generated from a deployment of one or more virtual machines; and
   values obtained from the parsing of the workload definition document.

3. The method of claim 2, further comprising chaining deployed virtual machines and deployed network appliance into a configuration defined by the workload definition document.

4. The method of claim 3, wherein each network appliance provides at least one of the following network security functions: IDS/IPS (intrusion detection system/intrusion protection system), command and control protection, malware protection, Secure Sockets Layer (SSL) man-in-the-middle inspection of encrypted traffic, firewall protection of web applications, application and application action control, protocol analysis-based intrusion prevention, URL filtering, Injection Logic Protection, Shell Code heuristics, and virtual patch.

5. The method of claim 1, further comprising receiving inputs from a user to control the deployment of a virtual machine configuration defined by the workload definition document, the user providing inputs via a Web Services GUI (graphical user interface).

6. A non-transitory, computer-readable storage medium, tangibly embodying a set of instructions to execute the method of claim 1.

7. The method of claim 1, wherein said parsing of said workload definition document results in values for variables to be filled into predetermined locations in said selected security template such that network appliances defined in a conventional workload definition document will be automatically set up with a conventional virtual configuration orchestration/management tool.

8. The method of claim 1, wherein said security template library comprises a plurality of security templates each prepared by an expert familiar with different security requirements of different types of possible workloads.

9. The method of claim 1, wherein said workload definition document defines virtual configurations in a virtualization infrastructure that turns an operating system into a hypervisor.

10. The method of claim 9, wherein said operation system comprise a Linux kernel and said virtualization infrastructure comprises a Kernel-based Virtual Machine (KVM) infrastructure.

11. A method, comprising:
executing, on a processor on a computer, a network appliance plug-in comprising a set of instructions tangibly embodied in a non-transitory storage device, to interface with a virtual configuration infrastructure management/orchestration system, the network appliance plug-in permitting an automatic selection of an appropriate security policy template for each network appliance defined in a workload definition document received by the virtual configuration infrastructure management/orchestration system;
accessing a library of security policy templates, as tangibly embodied in a non-transitory storage medium to retrieve said selected security policy template; and
executing a set of instructions tangibly embodied in the non-transitory storage device that:
receives a set of configuration data parsed from the workload definition document related to a security policy of any network appliance in the workload definition document;
selects an appropriate security policy template as a base image for each network appliance to be deployed;
merges deployment-specific data from a snapshot taken of each network appliance with the base image; and
returns each selected security policy template to the virtual configuration infrastructure management/orchestration system.

12. The method of claim 11, wherein said parsing of said workload definition document results in values for variables to be filled into predetermined locations in said to selected security template such that network appliances defined in a conventional workload definition document will be automatically set up with a conventional virtual configuration orchestration/management tool.

13. The method of claim 11, wherein said security template library comprises a plurality of security templates each prepared by an expert familiar with different security requirements of different types of possible workloads.

14. A method, comprising:
providing a network appliance plug-in comprising a set of instructions tangibly embodied in a non-transitory storage device, to interface with a virtual configuration infrastructure management/orchestration system, the network appliance plug-in permitting an automatic selection of an appropriate security policy template for each network appliance defined in a workload definition document received by the virtual configuration infrastructure management/orchestration system; and
providing a set of instructions tangibly embodied in the non-transitory storage device that:
receives a set of configuration data parsed from the workload definition document related to a security policy of any network appliance in the workload definition document;
selects an appropriate security policy template as a base image for each network appliance to be deployed;
merges deployment-specific data from a snapshot taken of each network appliance with the base image; and
returns each selected security policy template to the virtual configuration infrastructure management/orchestration system.

* * * * *